United States Patent [19]

Kerwin

[11] Patent Number: 5,616,033

[45] Date of Patent: Apr. 1, 1997

[54] SPEED LEARNING SYSTEM COMPUTER BASED TRAINING

[76] Inventor: Patrick A. Kerwin, 4561 Bordeaux, Dallas, Tex. 75205

[21] Appl. No.: 285,187

[22] Filed: Aug. 3, 1994

[51] Int. Cl.$^6$ ............................................. G09B 3/00
[52] U.S. Cl. ........................... 434/118; 434/322; 434/323
[58] Field of Search ..................... 434/118, 236, 434/322, 323, 327, 332, 335

[56] References Cited

U.S. PATENT DOCUMENTS

| | | |
|---|---|---|
| 3,566,482 | 3/1971 | Morchand . |
| 3,606,688 | 9/1971 | Zawels et al. . |
| 3,671,668 | 6/1972 | Reiffel . |
| 4,289,313 | 9/1981 | Delamontagne . |
| 4,416,454 | 11/1983 | Delamontagne . |
| 4,895,518 | 6/1990 | Arnold et al. ...................... 434/236 X |
| 5,002,491 | 3/1991 | Abrahamson et al. ................. 434/322 |
| 5,033,969 | 7/1991 | Kamimura ............................. 434/322 |
| 5,112,064 | 5/1992 | Weedman . |
| 5,314,340 | 5/1994 | Gaddis ................................ 434/322 X |

OTHER PUBLICATIONS

Norman A. Crowder, Tutor Texts, 1958, pp. i–iv and 1–18.
M. L. Phillips, Computer Controlled Logic Design Teaching Device, Feb. 1965, vol. 7, No. 9 IBM Technical Disclosure Bulletin.
William J. Hawkins, Video Teachers, 1984, 110–114, Popular Science.

Primary Examiner—Richard J. Apley
Assistant Examiner—Glenn E. Richman
Attorney, Agent, or Firm—Harold Levine, Esq, P.C.

[57] ABSTRACT

A training system including a visual display, a computer, a mouse and a keyboard for data entry into the system, such data entry including problems presented as situations/simulations tailored to the particular type of training to be conducted together with trainee responses to questions relating to such situations/simulations. Provision is made for the trainees to prepare and record their own narrative solutions to such situations/simulations, following which, the system presents sets of multiple choice solutions and asks the trainees to select what they believe are the best solutions from among those that are presented. The system then critiques trainee selections. For each situation/simulation, if the optimum solution has been selected, the system identifies the reasons why that selection is optimal and repeats the related situation/simulation at least once more after moving on to another situation/simulation before the training session is completed. If the optimum solution has not been selected, the system repeats its request for identification of the optimum solution, critiquing each answer until the correct one has been selected.

20 Claims, 2 Drawing Sheets

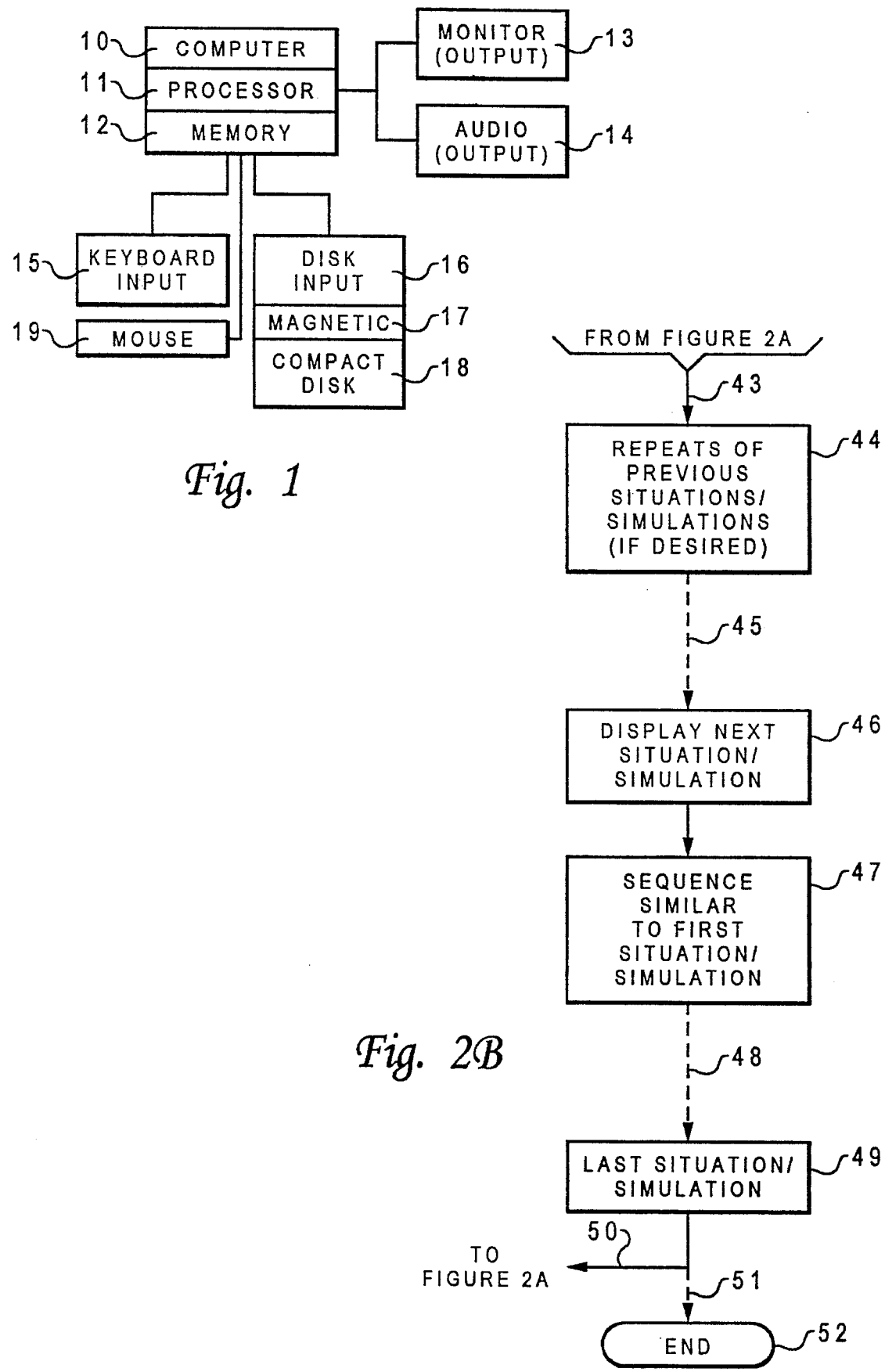

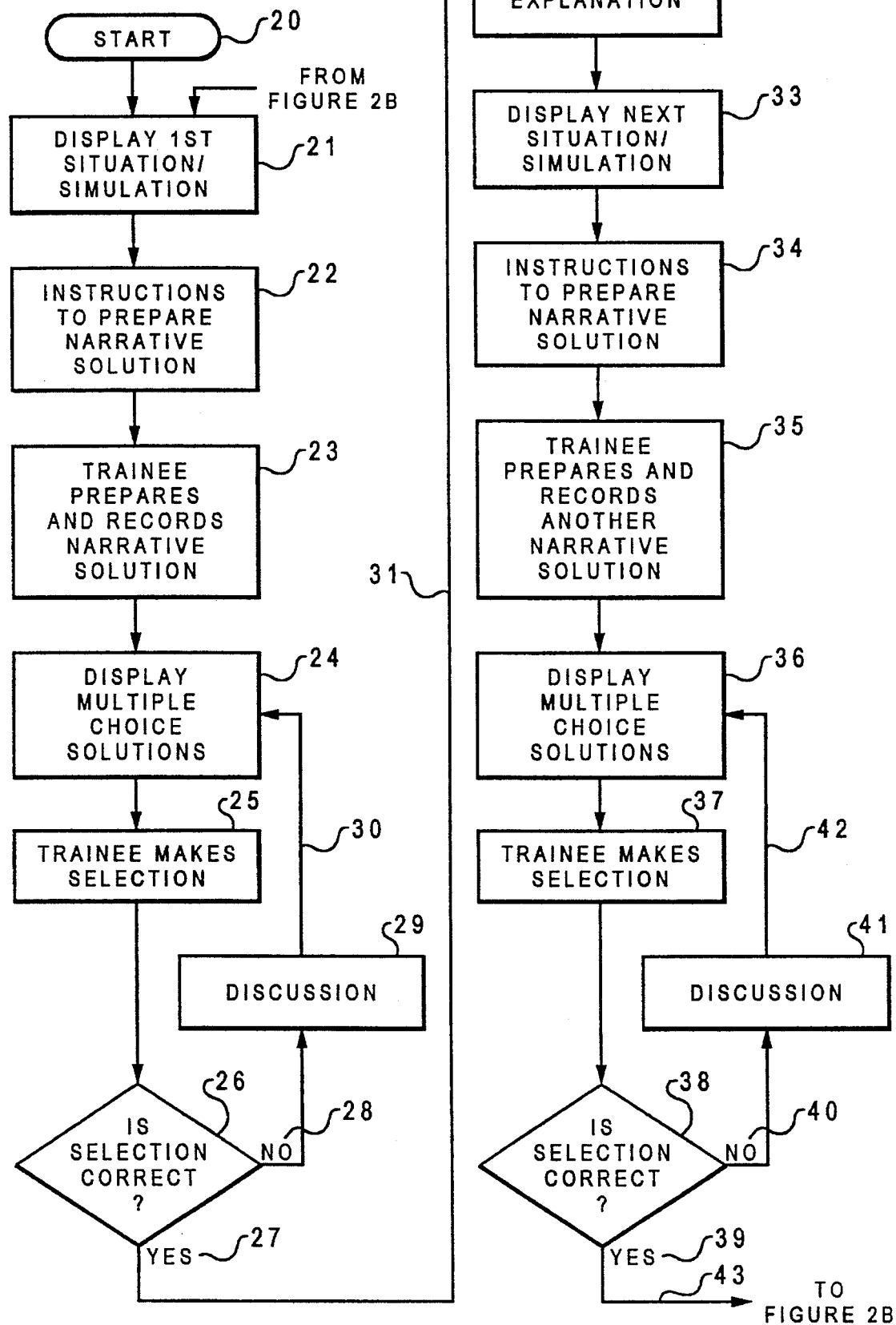

SPEED LEARNING SYSTEM COMPUTER BASED TRAINING

This invention relates to devices and methods for personnel training and more particularly to supervised or self-administered training in which a trainee is taught both through essay and multiple-choice exercises.

A variety of proposals have heretofore been made to automate training needs of employee personnel, illustrative of which are those contained In the publication "Tutor Texts", Copyright 1958 by Norman A Crowder and published by Doubleday & Company of Garden City, N.Y. In accordance with this proposal, one or more books introduce subject material to a reader, after which the reader is asked to answer multiple-choice questions about the material. A page reference is provided for the reader to review his answer, whether correct or incorrect. If correct, he then is instructed to continue with more new material. If incorrect, reference is made to an explanation and the reader is asked to again select the correct answer to the multiple choice question.

Other prior proposals include the use of television in conducting training, illustrative of which is U.S. Pat. No. 3,566,482 granted to C. A. Morchand Mar. 2, 1971. According to that proposal, a plurality of selector switches are coupled to selectively control presentation of a display on the cathode ray tube of a television receiver. In operation, a question and multiple choice answer can be presented within a first portion such as the top quarter segment of the cathode ray tube, the remainder of the tube being blank. A student, selecting what he regards to be the correct answer by operating one of the selector switches, unblanks a portion of the blank section of the tube to display information pertaining to the correctness of the selection.

Another proposal is that of U.S. Pat. No. 3,606,688 granted to Jacob Zawels et al. Sep. 21, 1971. According to that patent, students respond to questions appearing on their output screens and each obtains a personal immediate indication as to whether he is right or wrong and in some instances, the probable flaw in his reasoning if he is wrong.

Yet another proposal is that of U.S. Pat. No. 3,671,668 granted to Leonard Reiffel Jun. 20, 1972. According to that patent, there is disclosed a system for simultaneously teaching a multiplicity of students by presenting questions on a monitor screen, and each obtains a personal immediate indication as to whether he is right or wrong and in some instances, the probable flaw in his reasoning if he is wrong.

Still other proposals are those of U.S. Pat. No. 4,289,313 granted to Robert Delamontagne Sep. 15, 1981 and U.S. Pat. No. 4,416,454 granted to Robert Delamontagne Nov. 22, 1983. These patents both relate to a teaching game in which a player must pay his opponent a certain amount of play money determined by the number of questions the opponent has correctly answered in a given category corresponding to a given player position on a game board.

An additional proposal is that of U.S. Pat. No. 5,112,064 granted to Gail Weedman May 12, 1992. According to the proposals of the Weedman patent, there is disclosed a psychology game particularly adapted for play through publication in a newspaper or other periodical. Players are provided with a hypothetical person having a plurality of disclosed character traits, a description of a circumstance with which the hypothetical person is confronted, a plurality of descriptions of possible reactions of the hypothetical person to the circumstance, and an answer list for determining the accuracy of the player's reaction selection.

Another proposal is that of British Patent 1,095,701 for which the complete specification was filed Mar. 26, 1965. It relates to question and answer apparatus and teaching machines of the kind which present the student with a question and a number of answers, the student operating a control to select the answer which he considers to be the correct one.

Still another proposal is that of IBM Technical Disclosure Bulletin "Computer Controlled Logic Design Teaching Device" by M. L. Phillips in Volume 7, No. 9, February 1965. According to that bulletin, a computer requests the student, by a display device, to connect the function ABC into a given And block on a panel. The computer can specify any available And or Or block. When the student completes the assigned task, the student receives an indication of correct by an Indicator I associated with the given block. If the connects are in error, the student receives a type-out of the error(s) involved and additional information for solving the problem, if applicable, on the display device.

Yet another proposal is that of an article entitled "Video Teachers" by William J. Hawkins appearing in "Popular Science" magazine in 1984. The "Video Teachers" article describes an interactive video disc player in which questions are presented and answers checked. The player Is told whether his answers are right or wrong and why.

Although the foregoing disclosures present a variety of proposals for presenting situations/questions to students and checking their responses, they do not include the requirement for students first to prepare narrative responses prior to testing through the multiple-choice questions. Neither do they include the feature of repetitive questioning so as to ensure that the full potential of a problem situation is recognized by the student and retained in his repertoire. Accordingly, there has been a continuing need for an improved and more comprehensive self-administered teaching system that can be tailored to specific situations expected to be encountered by the student.

BRIEF SUMMARY OF THE INVENTION

The present invention overcomes the foregoing problems of the prior art in several respects: First, it provides for the training administrator to enter situations and simulations specific to his business; second, by requiring a student to first prepare and record a narrative description of his proposed solution to indicated problems before proceeding to a multiple choice test, it requires the student to "prove" his knowledge; and third, by repetitive questioning until a high probability of student retention is achieved.

The training system according to the inventions includes a visual display, a computer, a mouse and a keyboard for data entry into the system, such data entry including sets of problem situations tailored to the particular type of training to be conducted together with trainee responses to questions relating to such problem situations. Provision is made for presenting the problem situations to trainees and for the trainees to prepare and record their own solutions to such problem situations, following which, the system presents sets of multiple-choice alternatives, or "school" solutions and asks the trainees to select what they believe is the best solution from among those that are presented. The system then critiques the trainee selection. If the optimum solution has been selected, the system identifies the reasons why that selection is optimal before moving on to another problem situation. If the optimum solution has not been selected, the system repeats its request for identification of the optimum solution, critiquing each answer until the correct one has been selected.

OBJECTS AND FEATURES OF THE INVENTION

It is one general object of the invention to improve computer based training systems.

It is another object of the invention to improve student understanding of tailored situations/simulations and relevant considerations applicable thereto.

It is yet another object of the invention to reduce the length of time required to train personnel.

It is still another object of the invention to achieve a higher level of learning in a self-administered computer-based training system.

It is yet another object of the invention to reduce management time required for employee training.

Accordingly, in accordance with one feature of the invention, teaching of basics is included; and provision is made for customizing the teaching by including capability for a user/administrator to add problem situations/simulations tailored to his/her individual work environment, thus focusing teaching on representative specifics of the intended environment.

In accordance with another feature of the invention, sets of general problem situations/simulations may be provided in addition to those tailored to the particulars of the intended environment.

In accordance with another feature of the invention, trainees are instructed to prepare narrative descriptions of their proposed actions/solutions to situations/simulations before being presented with multiple choice questions, thereby providing enhanced learning and the ability to monitor trainee progress.

In accordance with yet another feature of the invention, trainee narrative descriptions are recorded in system memory to provide an easily retrievable record and facilitating review by supervisory personnel.

In accordance with still another feature of the invention, after completing the foregoing narrative descriptions, trainees are presented with a set of multiple-choice questions relating to the then-presented situation/simulation; and trainees are instructed to select the best answer, after which considerations relating to the selected answer are displayed.

In accordance with yet another feature of the invention, if the foregoing answer is incorrect, and after considerations relating to the selected answer are displayed, the trainee is again instructed to choose among the multiple-choice solutions until the correct one is chosen.

In accordance with still another feature of the invention, the presentation of the same situation/simulation including the request for a narrative description, and presentation of multiple choice questions is repeated until the trainee has selected the correct answer at least twice, thereby reinforcing his/her learning of the material thoroughly.

BRIEF DESCRIPTION OF THE DRAWING

FIG. 1 is a overall view illustrating basic physical elements of the system; and FIGS. 2A/2B are diagrams illustrating the sequence of steps in practicing the method according to the invention.

DETAILED DESCRIPTION OF THE INVENTION

Now turning to the drawing, and more particularly FIG. 1 thereof, it will be seen to depict a conventional computer 10 having a processor 11 and memory 12. Connected to computer 10 and acting as outputs therefrom are conventional video-type monitor 13 and optional conventional audio transducer (e.g., loudspeaker) 14. Connected to computer 10 as inputs thereto are conventional keyboard 15 and optional conventional magnetic disk input 17, optional conventional compact disk input 18, and mouse input 19. All of these components are conventional and well known to those skilled in the art.

The learning system preferably is practiced using the foregoing system components, although it may be practiced with alternate components such as overhead projectors or projectable slides.

Employing the preferred components, initiation of system operation is represented by start rectangle 20 (FIG. 2A). This contemplates turning on the system power and loading the teaching program into active memory of the computer in accordance with principles well known in the art. When the system then is operational, monitor 13 displays the first situation/simulation as represented by rectangle 21. By situation/simulation is meant a written description of a learning incident such as a set of circumstances that may arise in conducting the business or profession to which the teaching/learning system is directed. An example of such situation/simulation is as follows: "A person with whom you do not wish to speak has telephoned you. What should you do?".

After the trainee has had time to read and understand the foregoing situation/simulation, he is instructed to enter into computer memory through keyboard 15 a narrative describing his proposed solution to the presented situation/simulation as represented by rectangle 22. After entering such narrative (rectangle 23), the trainee is instructed to advance the system by pressing a mouse button pointed to a screen "button", after which the system progresses to present on monitor 13 four multiple choice solutions to the first situation/simulation as represented by rectangle 24. The trainee is then instructed to make a selection from among the available solutions as represented by rectangle 25. At this point, the question is identified by conventional logic 26 as to its accuracy whether yes 27, it is the best answer or no 28, it is not the best answer. If no, operation of the system then proceeds to display on monitor 13 a discussion 29 identifying why the selection was not the best, and instructs the trainee to advance the system by pressing a mouse button, after which the system returns (as represented by path 30) to the same set of multiple choice solutions (rectangle 24)) which are again presented, and the trainee is again asked to make a selection. As with his first-time selection, if his second-time selection is inaccurate, the system returns via no answer path 28, discussion rectangle 29 and path 30 to rectangle 24. However, if the answer is now correct, the system proceeds as by yes path 27.

It should be noted that the loop via no path 28 and discussion rectangle 29 repeats so long as the trainee makes an incorrect choice to the multiple answer question. Eventually, the trainee will run out of answers that he has not previously selected and will make a correct selection. In any event, even if the first time through the trainee makes a correct selection, the system will subsequently repeat the situation/simulation at least once as will now be evident from reference to FIG. 2B. The actual number of times the situation/simulation is repeated is at the discretion and under the control of the above-mentioned training/system administrator.

Yes 27 leads via path 31 to explanation rectangle 32 which represents a visual display on monitor 13 of considerations relevant to and supporting the correct multiple solution answer choice. Although later, the trainee is again presented at least once more with each of the previous situations/simulations as represented by a return to rectangle 21 via loop 50, in the present sequence, more situations/simulations are presented as represented by rectangle 33 which is labelled "Display Next Situation/Simulation". The trainee is again requested to prepare and record his proposed solution (rectangle 34). After the trainee has prepared and recorded such narrative solution (rectangle 35), the current multiple choice solutions are presented to the trainee (rectangle 36), after which the trainee makes his selection as represented by rectangle 37. Logic 38 then determines whether this latest choice is correct or not. If correct, system operation progresses as represented by yes answer 39. However, if the answer is incorrect as represented by "no" output 40, the system proceeds with discussion 41, and returns via path 42 to rectangle 36 whence operation again proceeds as previously described.

It will be recalled that one of the features of the invention lies in the repetitive nature of system operation. Thus, even if a trainee answers a multiple choice question correctly the first time it is asked, he still is asked at least one more time to prepare his narrative solution and to again view and respond to the multiple choice question. It has been found that such repetition results in a substantially enhanced training experience both in regard to the level of understanding and also to a reduction in time required to achieve a high understanding level. Also, by repeated preparation of narrative descriptions of situation/simulation solutions, a trainee becomes better prepared to apply the principles underlying the correct solutions to such variations of the situations/simulations as may be encountered in subsequent experience.

After proceeding via yes response 39, system sequence proceeds as represented by path 43. At this point in system sequence, if the trainer desires to present a previous situation/simulation again, such is represented by rectangle 44 "Repeats of Previous Situations/Simulations (if desired)". Such is presented at this point in system sequence to illustrate the fact that repeats of previous situations may be made at any desired point in system operation in addition to occurring after all the situations/simulations have been presented the first time. Ordinarily, however, it is contemplated that all or most of the situations/simulations will have been presented to the trainee before he is again presented with a previous situation.

If it is not desired at this point to repeat a previous situation, system operation by-passes the step of rectangle 44 and proceeds as by path 45 to display the next situation/simulation (rectangle 46). The system then proceeds as described with respect to the first and second situations/simulations (rectangle 47) and, after the trainee has chosen the correct solution from among the multiple choice answers, the system continues on with successive situations/simulations (as denoted by dashed line 48) until it arrives at the last situation/simulation (rectangle 49) and all of the situations/simulations have been presented at least once. Then, at the option of the training administrator, system operation proceeds as by loop path 50 to sequentially present some or all of the situations/simulations again; or as by dashed line 48.

As is well known to those skilled in the art, signalling of stop/pause may be conducted by depressing a designated key on the input keyboard 15 or clicking a button on the screen with the mouse. Such may be done at any step in the system sequence, and the system will note the point at which the sequence has stopped and be prepared to resume operation from that point if desired or be reset to the beginning if so instructed by keyboard or mouse inputs.

As previously mentioned, it is one of the features of the invention that the system provide for presentation of situations/simulations that are particularly tailored to the environment in which the trainee is expected to work. However, as will be evident to those skilled in the art, the system may also advantageously include generalized situations/simulations that are universally applicable. These may, of course, be input to system memory 12 by any of a variety of devices that are well known in the art, devices such as keyboard input 15, disk input 16, magnetic medium 17 and/or compact disk 18.

It will now be evident to those skilled in the art that there has been described herein an improved computer-based learning system that through a combination of repetitive narrative solutions and multiple choice questions greatly facilitates trainee learning, shortening time for a trainee to become proficient in utilizing his newly acquired skills as well as providing a ready way for training supervision to monitor learning progress.

Although the invention hereof has been described by way of a preferred embodiment, it will be evident that other adaptations and modifications can be employed without departing from the spirit and scope thereof. For example, some of the steps in the system procedure could be conducted mechanically in addition to those conducted electrically.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A speed learning system for trainee teaching comprising:

(a) a computer;

(b) an input to said computer;

(c) an output from said computer;

(d) storage means associated with said computer for receiving and storing a plurality of customized problem situations;

(e) means including said storage means for storing a set of multiple choice solutions for each of said problem situations;

(f) means for presenting said problem situations to said trainee;

(g) means for instructing said trainee to prepare and store in said computer narrative descriptions of his/her proposed solutions to said problem situations;

(h) means including said computer for presenting to said trainee sets of multiple-choice solutions to said problem situations;

(i) means including said output for instructing said trainee to select one of said multiple-choice solutions;

(j) selection identification means including said input and said output for identifying the selection made by said trainee and (i) when said selection is correct, for displaying considerations supporting such selection, and (ii) when said selection is incorrect, for displaying an indicia thereof together with instructions to said trainee to make another selection.

2. A speed learning system for trainee teaching according to claim 1 wherein said output includes a visual display.

3. A speed learning system for trainee teaching according to claim 2 wherein said visual display comprises a computer monitor.

4. A speed learning system for trainee teaching according to claim 1 wherein said input comprises a computer keyboard and a mouse.

5. A speed learning system for trainee teaching according to claim 1 wherein said input comprises a floppy disk.

6. A speed learning system for trainee teaching according to claim 1 wherein said input comprises a compact disk.

7. A speed learning system for trainee teaching according to claim 1 wherein said output comprises a computer monitor and said input comprises a computer keyboard.

8. A speed learning system for trainee teaching according to claim 1 wherein said means for instructing said trainee to prepare and store in said computer narrative descriptions of his/her proposed solutions to said problem situations includes means associated with said computer for storing said narrative descriptions.

9. A speed learning system for trainee teaching according to claim 1 wherein said selection identification means is effective when said selection is correct for additionally displaying reward indicia.

10. A speed learning system for trainee teaching according to claim 1 wherein said storage means associated with said computer for receiving and storing a plurality of customized problem situations further includes means associated with said computer for receiving and storing a plurality of generalized problem situations.

11. A speed learning system for trainee teaching comprising:

(a) a computer;

(b) a visual display connected to said computer;

(c) means for entering data into said computer;

(d) means for storing indicia identifying problem situations customizable to any of a variety of users;

(e) means for storing a set of multiple choice solutions for each of said problem situations;

(f) means responsive to activation by said trainee for displaying on said visual display trainee-selected ones of said problem situations;

(g) means for instructing said trainee to prepare and enter into said computer a narrative description of his/her proposed solutions to said trainee-selected ones of said problem situations;

(h) means for presenting to said trainee a set of multiple-choice answers to each problem situation selected by said trainee;

(i) means for said trainee to select one of said multiple-choice answers;

(j) means for identifying the selection made by said trainee and
 (i) when said selection is correct, for displaying a reward indicia together with a presentation of considerations supporting such selection, and
 (ii) when said selection is Incorrect, for displaying an indicia thereof together with instructions to said trainee to prepare and enter into said computer another narrative description of his/her proposed solutions and thereafter make another selection from among said multiple choice answers.

12. A speed learning system for trainee teaching according to claim 11 in which said means for identifying the selection made by said trainee further includes means effective when said selection is correct for the first time, for displaying instructions to said trainee to prepare another narrative description of his/her proposed solution to said problem situation.

13. A method of teaching a person comprising:

(a) providing a computer;

(b) entering and storing a plurality of customized problem situations into said computer;

(c) storing a set of multiple choice solutions for each of said problem situations;

(d) presenting said problem situations to said person;

(e) instructing said person to prepare and enter into said computer narrative descriptions of his/her proposed solutions to said problem situations;

(f) recording in said computer solutions to said problem situations as entered by said person;

(g) presenting to said person sets of multiple-choice answers to said problem situations;

(h) requesting said person to select one of said multiple-choice answers;

(i) identifying a selection made by said person and
 (i) when said selection is correct, displaying considerations relevant to such selection, and
 (ii) when said selection is incorrect, displaying an indicia thereof together with instructions to said person to make another selection.

14. A method of teaching according to claim 13 wherein the step of entering and storing a plurality of customized problem situations into said computer includes accessing a floppy disk.

15. A method of teaching according to claim 13 wherein the step of entering and storing a plurality of customized problem situations into said computer includes accessing a compact disk.

16. A method of teaching according to claim 13 wherein the step of presenting said problem situations to said person includes displaying indicia of said problem situations on a computer monitor.

17. A method of teaching according to claim 13 wherein the step of requesting said person to prepare narrative descriptions of his/her proposed solutions to said problem situations includes displaying the request on a computer monitor.

18. A method of teaching according to claim 13 wherein the step of recording solutions to said problem situations as proposed by said person includes recording said solutions on magnetic media.

19. A method of teaching according to claim 13 wherein the step of requesting said person to select one of said multiple-choice answers includes displaying such request on a video monitor.

20. A method of teaching according to claim 13 further including a step of entering and storing a plurality of generalized problem situations into said computer.

* * * * *